United States Patent [19]
Girardin et al.

[11] Patent Number: 5,118,914
[45] Date of Patent: Jun. 2, 1992

[54] PROTECTIVE DEVICE FOR MACHINING HEADS

[75] Inventors: Roger Girardin, Vernier, Switzerland; Joseph Josserand, Cruseilles; Jean-André Ruffin, La Bergue, both of France

[73] Assignee: Charmilles Technologies S.A., Meyrin, Switzerland

[21] Appl. No.: 441,059

[22] Filed: Nov. 22, 1989

[30] Foreign Application Priority Data

Nov. 22, 1989 [CH] Switzerland .................. 04325/88

[51] Int. Cl.$^5$ .................. B23H 1/00; B23H 11/00; B23Q 5/58
[52] U.S. Cl. .................. 219/69.11; 219/69.16; 219/69.19; 73/730; 73/820
[58] Field of Search .................. 73/730, 731, 820; 219/69.11, 69.12, 69.15, 69.16, 69.19

[56] References Cited

U.S. PATENT DOCUMENTS 4,814,574 3/1989 Babel et al. .................. 219/69.12

FOREIGN PATENT DOCUMENTS 1-135422 5/1989 Japan .................. 219/69.12

*Primary Examiner*—Geoffrey S. Evans
*Attorney, Agent, or Firm*—Gifford, Groh, Sprinkle, Patmore and Anderson

[57] ABSTRACT

A machining head carries at its end a sensor comprising a pressure-sensitive element (4) mounted on the parts (1, 2) holding the injector jet for the machining fluid, as well as the buffering pieces (5, 6, 12) forming a shield. The element (4) is an insulating and watertight tube, arranged to form a ring in the space left between the coaxial, truncated conical surfaces of the parts (1) and (2). It contains conducting parts which come into contact with one another when it is deformed by the action of a pressure whose value exceeds a given threshold. This results in the closing of an electrical circuit which transmits an appropriate signal to the controls of the EDM machine in order to interrupt the relative movement of the head. The device enables any shock or abnormal stress acting on the end of the machining head to be detected. By means of an O-ring seal (7) acting as a hinge, the part (1) and the piece (12) are returned to their original positions when the stress disappears. Also, the seal (7) permits an overrun to occur.

16 Claims, 1 Drawing Sheet

PROTECTIVE DEVICE FOR MACHINING HEADS

The present invention relates to a protective device preventing a machining head from being subjected to stress above a given threshold owing to collision or the use of excessive pressure.

In fact, machining heads, and particularly those used in electrical discharge machining with cutting wire (hereinafter referred to as EDM cutting), contain various fragile components, such as wire-guides and the contacts supplying the machining current to the wire electrode; in certain cases, the upper head is mounted on a mechanism enabling it to be moved in a horizontal plane so as to displace the position of the upper wire-guide relative to that of the lower wire-guide, thus inclining the wire electrode. In general, this comprises a particularly fragile cross-slide table. These various components determine the accuracy of the machining obtained. Now, any shock or excessive stress applied to the ends of the machining heads may damage or derange these components, particularly the cross-slide table.

It is now possible to program the various relative movements between the machining heads, and particularly between the upper machining head, the workpiece and the components holding it, as well as the other mechanisms which may be present in the machining bath, in such a manner as to avoid collisions. However, these movements are highly complex. Thus, in the example chosen here to describe the operation of the device according to the present invention, the upper machining head may be moved vertically with respect to the workpiece by means of a first control (Z axis); it may also be moved horizontally along two orthogonal axes (U and V); the lower head is fixed. The workpiece is mounted in a fixed position on a mechanism (cross-slide table) enabling it to be moved horizontally along two orthogonal axes (X and Y). The control of these various movements often has to enable the machining of complex trajectories with constantly varying feed velocities and taper angles in workpieces whose surfaces facing the machining heads are not horizontal. Programming errors will all the more often result in collisions between one of the heads and one of the other components present in the machining zone if the machining heads are kept as close as possible to the workpiece (so as to ensure adequate injection of the machining fluid in the slot being cut), and if the machining speeds are high.

It is therefore important to protect the machining heads in case of shock or excessive pressure resulting from an obstacle unforeseen in the program and finding itself in their path, by rapidly detecting such an event and immediately acting on the controls of the machine so as to modify its functioning in such a way as to remove as quickly as possible the stress applied to the head, either by stopping movement of the head or by initiating a reverse or withdrawal movement.

Anti-collision devices stopping the movement of the machining head when the distance separating it from an obstacle placed in its path becomes less than a preset threshold are known in the prior art. Thus, a device of this type incorporating an ultrasonic proximity detector is described in the Japanese patent application 62-152,640. DOS 37 23 250 describes an anti-collision device for an EDM machine enabling a distance greater than a given threshold value to be maintained between the components clamping the workpiece and the wire electrode. This device comprises a protuberance placed on the lower head and arranged so as to abut against an elastic part placed opposite the said protuberance on the workpiece holder, which is deformed when the protuberance abuts against it; this deformation then causes relative motion between the workpiece and the wire electrode to stop.

A further safety device of the prior art which should be mentioned here is described in the Japanese patent application 62-63020, intended to stop machining on an EDM die-sinking machine so as to prevent the electrodes from being damaged by being forced against one another in case of malfunction of the device controlling the feed of the tool into the workpiece. This comprises a strain-gauge mounted on the tool carrier and connected to a circuit arranged so as to stop the feed of the tool when the force applied to it exceeds a given threshold.

Other devices of the prior art include machining-fluid jets mounted at the ends of the heads to irrigate the slot being cut and constructed in such a way as to withdraw themselves in the case of a frontal collision, or to swing aside so as to avoid an obstacle (EP 271 439).

However, none of these devices of the prior art enable machining heads of the currently-used type to be protected without having to replace the injector jets by jets of a new type. Such a replacement generally involves varying the distances separating the different components placed along the path of the wire electrode, resulting in turn in important structural modifications, particularly to the systems for the automatic threading and rethreading of the wire.

Furthermore, each of the prior art devices only enables collisions with a particular type of obstacle to be avoided.

The aim of the present invention is to propose a device protecting the machining heads, and particularly those of an EDM wire machine, in case of a collision with any kind of obstacle and capable of being mounted on the machining heads of existing machines without the need for important structural modifications to the components mounted at their ends, and in particular retaining the distances separating the various components located along the path of the wire electrode.

The object of the invention is a protective device for machining heads enabling a shock or abnormal stress applied to the end of a machining head to be detected and causing the relative motion between the said head and the obstacle to be interrupted, comprising a sensor mounted on a component placed at the end of the head, arranged so as to detect the application to this end of any force exceeding a preset reference value, irrespective of the direction of the said force and its point of application, and to transmit a signal to the controls of the machine in order to interrupt the relative movement between the said head and the obstacle, and finally to reduce the force applied to below the reference level or even to eliminate the force altogether.

In the case of the machining head of an EDM wire machine, the component on which the sensor is mounted is a machining-fluid injector jet whose function is to irrigate the slot being cut in the workpiece.

According to the method of programming the digital control receiving the signal emitted by the sensor, the signal will in general also activate the control for withdrawing the wire electrode for a short, preset distance from the slot being cut in the workpiece. It may also activate stoppage of machining.

The signal may also actuate an audible or visible warning device to alert the operator of the machine.

In order to increase the degree of protection and improve the efficiency of the sensor, the device according to the invention may also comprise a shield or buffer covering the head opposite the workpiece, and raised at an oblique angle to the walls of the head. An opening corresponding to the output nozzle of the jet and to the passage of the wire is made in this buffer when a EDM wire machine is concerned.

Such a device enables the upper machining head of an EDM wire machine to be protected from shocks arising from collisions with the clamps holding the workpiece or with protuberances of the said workpiece, for example. It may also serve to detect the falling on the lower machining head of parts which have been cut out of the workpiece, or shocks arising from collisions of the said lower head with the supports maintaining the workpiece in a fixed position in the machining tank and which are integrally fixed to the latter; in effect, these supports move horizontally with the tank relative to the lower head and may therefore collide with it.

Any kind of sensor may be used in the protective device according to the invention, provided that it can withstand without damage the vibration and often sudden movements of the machining head. Machining is usually carried out in immersion, so that the lower head and the workpiece, as well as the end of the upper head are generally immersed in the machining fluid, most frequently composed of water and/or a hydrocarbon. Thus, the protective device must be watertight. The sensor must also be capable of withstanding the electric field generally existing in the cutting zone and also the temperature variations occurring during machining. An optical sensor cannot be used, since the machining fluid is not usually very transparent.

In most of the embodiments of the present invention, the sensor should be a pressure-sensitive device, watertight and connected to an electrical circuit enabling it to transmit signals to a machine control and possibly a warning device. It may, for example, be enclosed in a housing preferably made of an electrically insulating material so as to avoid an electrical overload on the machining head in case of breakage of the wire electrode, which latter could then come in contact with the lower end of the machining head and hence with the sensor.

The sensor should not be too sensitive, for example by reacting to the mere proximity of an obstacle. In fact, for the majority of machining tasks, the injector jet in which the sensor is mounted is located at only a few tenths of a millimeter from the workpiece. The sensitivity is adequate if it responds to a shock or an applied force of the order of about 0.1 kg.

Finally, as has been stated above, the sensor should be multidirectional, i.e. it must be capable of detecting a stress in no matter what direction the said stress is applied. It must also be capable of detecting contact with an obstacle at any point on the lower face of the machining head or up to a certain height on the walls of the head in the vicinity of the said lower face.

The device according to the present invention can have a very large number of embodiments. Only a few of the possible variations are illustrated diagrammatically by way of examples in the attached drawings.

Figure 1:
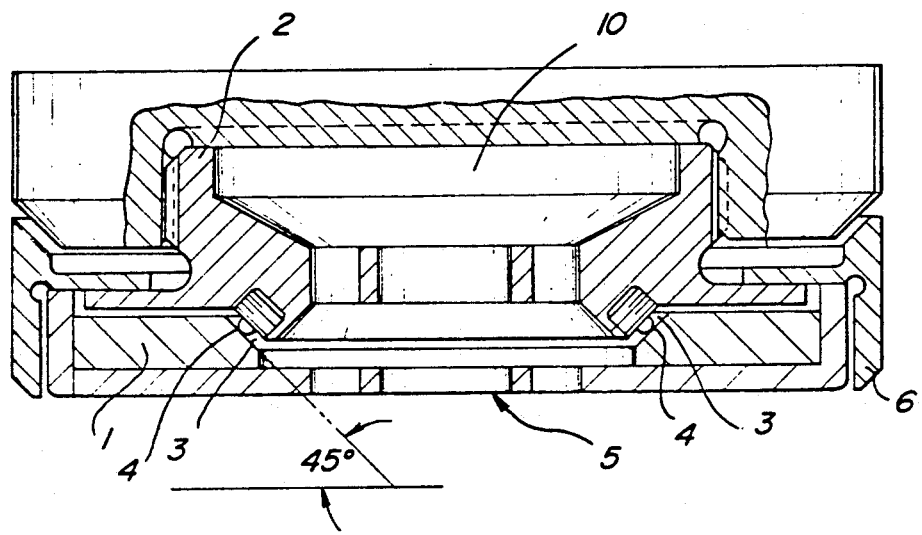
FIG. 1 represents a cross-section of a machining head incorporating a device according to one of the embodiments of the invention mounted in the injector jet placed at the lower end of the head.

The outline of an upper machining head for an EDM wire machine is shown in FIG. 1. Only the end of the injection system is represented. The components are well known in the present state of the art: the chamber (10) for the machining fluid, and the casing and holder for the conical injector jet. For the purposes of the invention, this latter is split into two parts (1) and (2). These enclose a space (3) between two truncated conical surfaces. In FIG. 1, these surfaces are at an angle of 45 degrees to the vertical, although it is possible to choose other values for this angle. The sensor or detector (4) of the device according to the invention is mounted in this space. In the present example this takes the form of an annular tube comprising conductors embedded in an elastic insulating material and connected to a detector circuit, marketed by "BRIDGESTONE" under the name of "CORD SWITCH". When this ring is compressed the conductors contact one another and allow an electric current to pass. Any stress applied to no matter what point on the piece (5) or the edge (6) of the housing will cause the part (1) to move towards the part (2) and hence compress the sensor (4), irrespective of whether the direction of movement be vertical, horizontal or oblique. To prevent the jet from acting as an electrode and hence being accidentally machined by the wire, it is generally made of an insulating material such as a plastic, for example "DELRIN".

A number of alternative forms are possible for the detector (4), in particular all components which emit an electrical signal when compressed. Instead of using an annular detector the use, for example, of a series of spherical detectors arranged like the points of a crown could also be envisaged. The conducting parts of the device are preferably surrounded by insulating and watertight materials.

As in this example, the sensor could comprise a sphere made of a material deformable under pressure and containing conducting parts which contact one another when the pressure-sensitive component is deformed by applying a pressure of a given value.

The detector might also comprise a hollow tube, possible curved round to form a ring, containing a fluid. The fluid may circulate around the ring, the variation in rate of flow or fluid pressure occurring when the ring is subjected to a stress being detected by a hydraulic sensor placed in the circuit. Another possibility is to have a certain volume of fluid contained in a closed ring, which is compressed when a stress is applied to the ring, the variation in pressure being detected by a suitable sensor. The flexible material surrounding the conducting parts or the fluid is preferably elastic.

The tubes of these pneumatic or hydraulic detectors are not necessarily cylindrical, since the variation in hydraulic or pneumatic pressure is uniformly distributed throughout the detector, no matter what the cross-section of the tube.

In another alternative form, the tube with circulating fluid may be connected to a level detector, for example a vertical capillary tube, possibly with graduations, capable of being calibrated so as only to indicate variations in level corresponding to pressures exceeding a given value. These variations in level are due to local deformations of the tube caused by a collision or an abnormal stress applied to the machining head.

It should be pointed out here that the use of microswitches does not seem advisable, since they do not withstand immersion well, and are also affected by the electrical potential difference between the two electrodes which is transmitted by the machining fluid, particularly when this latter contains water.

The detector (4) can thus be easily adapted to fit the holders of injector jets as mounted in the machining heads of currently-used machines, while retaining practically the same original height of the head and hence its mode of operation, and particularly the various adjustments and software already in use. For example, the device illustrated in FIG. 1 introduces an increase in the height of the head of only a few millimeters. Assembly is quite easy: it suffices to fit several washers of which one carries the detector (4). It is thus easy to replace a faulty detector. The space taken up by the device is practically nil. It will operate satisfactorily even when immersed in a machining fluid composed of water with a conductivity of 5 to 1000 uS carrying fine metal particles in suspension. It remains insensitive to forces less than 0.1 kg. Its response time is very short; in most cases this is of the order of a millisecond.

Figure 2:
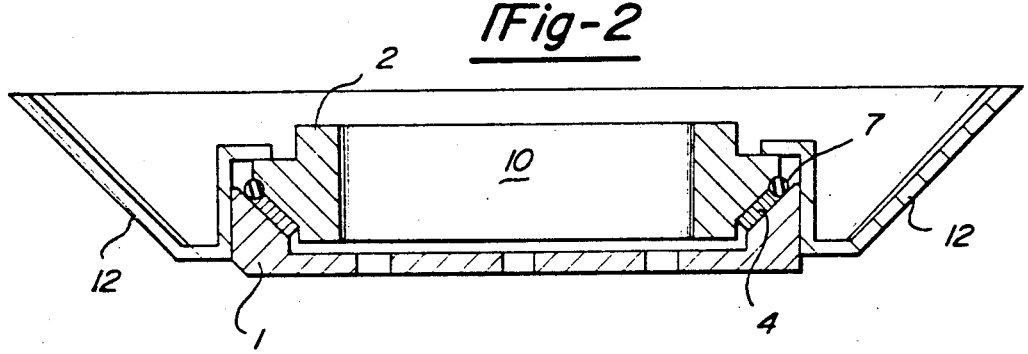
FIG. 2 represents a cross-section of a machining head fitted with a protective device comprising a shield, according to another embodiment of the invention.

The device illustrated in FIG. 1 may be supplemented by a piece in the form of a shield, as illustrated in FIG. 2. The various components already shown in FIG. 1 are designated by the same reference numbers. The piece (12) in the form of a shield is so designed and mounted that any stress applied at any point of it is transmitted to the part (1), moving it towards the part (2), thus compressing the detector (4) and the seal (7). Owing to the elasticity of the seal (7), consisting in this case of an O-ring seal, the part (1) and the piece (12) are returned to their original position since the force which pushed them towards the part (2) has disappeared. The seal (7) also has another function: by allowing an overrun to occur it enables the device to operate safely, since the time required to crush it gives the machine time to respond to the signal emitted by the sensor and thus prevent the part (1) from colliding with the part (2).

Figure 3:
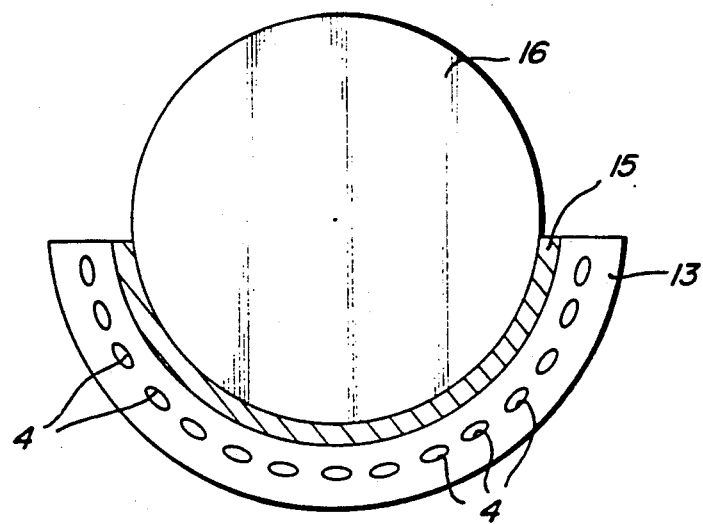
FIG. 3 illustrates one of the numerous alternative forms of sensor usable in the protective device according to the present invention.

Another embodiment of the device according to the present invention is illustrated in FIG. 3. Here there is a buffer (13) in the form of a shield placed around the machining head (16). The detector (4) for shocks or abnormal pressures is in this case mounted directly on the buffer (13) and extends over the whole surface of the latter. In this embodiment the sensor consists of a fine pressure-sensitive network o: conducting parts, for example contact mats available on the market under the name "REGLOMAT", from the company of the same name. It is also possible to use as a sensor a contact sheet made of a pressure-deformable plastic, separated by an intermediate insulating grid from a circuit sheet, both the circuit sheet and the contact sheet being coated with a conducting ink, in the manner of flexible waterproof keyboards and withstanding temperature variations from 30 degrees C to 130 degrees C, made available on the market by PLAQUETTES INDUSTRIES under the name of "PIM SENSOR". Efficient detection can also be obtained by means of a pressure-sensitive strip, tube or wire (or deformable capsules, optical fibres, deformable elastic tubes filled with a fluid "CORD SWITCH", etc.) arranged as required on one of the faces of the buffer (13), or embedded inside it.

This sensor is placed in an electrically insulated and watertight enclosure, which may be formed by the buffer (13) and the anvil piece (15). The sensor may also be embedded in the material forming the buffer (13). This material should be deformable to ensure that the stress is transmitted to the detector (4). It should preferably be elastic. The anvil piece (15) is made of a rigid material, thus acting as an anvil against which the detector (4) is crushed or deformed. The resistances to pressure of these various materials are preferably chosen so that the whole assembly can accommodate an overrun, the buffer (13) continuing to crush itself against the anvil piece (15) after the sensor (4) has emitted a signal, while a certain thickness of the material composing the buffer (13) can be interposed between the anvil piece (15) and the sensor (4).

Protective devices according to the present invention offer many advantages. As mentioned above, they protect machining heads against shocks arriving from whatever direction and at whatever point of impact; they do not require any extensive structural modifications to the head.

They enable the distance between the machining head and the surface of the workpiece to be kept very small, thus enhancing the efficiency of injection and enabling machining to be carried out at a high speed.

Since these devices only respond to stresses exceeding a given limiting value, they will not interrupt the machining process when subjected to relatively weak shocks. Thus, a machining head protected by a device according to the invention may follow slight irregularities of the workpiece and even ride over an obstacle if it is fitted with a swinging or rocking jet as described in the European patent application 271.439, without machining being uselessly interrupted.

It is therefore possible to simplify the programming or the movements of a machining head protected by a device according to the invention, as well as the adjustments, particularly that for the height of the machining head as a function of variations in the thickness of the workpiece.

The protective device according to the present invention has been described here with particular reference to the machining heads of an EDM wire machine. However, it may also be used on the machining heads of other types of machine tools, for example as a replacement for the microswitches used in certain anti-collision or positioning devices of the prior art.

We claim:

1. A protective device for use on a machining head of a machine having controls, said protective device enabling a shock or abnormal stress applied to the end of the machining head by an obstacle to be detected and the relative movement between the machining head and the obstacle to be interrupted, said protective device comprising, a sensor mounted on a component located at the end of the machining head and arranged so as to detect the application to the machining head end of a pressure force exceeding a predetermined reference value, said detection being irrespective of the direction of application of said force and its point of application, said sensor also transmitting a signal to the controls of the machine in order to interrupt the relative movement between the machining head and the obstacle to reduce the pressure force to below said aforesaid reference value, said reduction of the pressure force including the elimination of said force altogether.

2. The device in accordance with claim 1, characterized in that said sensor includes a pressure-sensitive components.

3. The device in accordance with claim 2, characterized in that said pressure sensitive component contains conducting parts which contact one another when said component is deformed by the action of a pressure exceeding a given limiting value.

4. The device in accordance with claim 2, characterized in that said pressure sensitive component is deformed when subjected to a pressure exceeding a given limiting value.

5. The device in accordance with claim 1, characterized in that said sensor is arranged so as to emit a signal actuating an alarm.

6. The device in accordance with claim 5, wherein said alarm is an audible alarm.

7. The device in accordance with claim 5, wherein said alarm is a visible alarm.

8. The device according to claim 5 wherein the machine is an EDM machine and the controls are a digital control system having a screen connected thereto, said alarm is an error indication on said screen.

9. The device in accordance with claim 1, characterized in that said sensor is arranged so as to emit a signal causing interruption of the relative movement between the machining head and the obstacle before either of these components can collide with said component located at the end of the machining head.

10. The device in accordance with claim 1, characterized in that said component located at the end of the machining head is the housing carrying an injector jet for a machining fluid.

11. The device in accordance with claim 10, characterized in that said sensor is a pressure-sensitive ring located in a space between two parts of a coaxial housing having opposing truncated conical surfaces.

12. A protective device for use on a machining head enabling a shock or abnormal stress applied to the end of the machining head by an obstacle to be detected and the relative movement between the machining head and the obstacle to be interrupted, said protective device comprising a sensor mounted on a component located at the end of the machining head and arranged so as to detect the application to the machining head end of a pressure force exceeding a predetermined reference value, said detecting being irrespective of the direction of application of the force and its point of application, said sensor also transmitting a signal to the controls of the machine in order to interrupt the relative movement between the machining head and the obstacle and also to reduce the pressure force to below said aforesaid reference value, said sensor including a pressure-sensitive component and a fluid sensor, characterised in that said pressure-sensitive component is a hollow, deformable tube through which a fluid is circulated, said fluid sensor being arranged so as to detect a variation in the rate of flow of said fluid.

13. The device in accordance with claim 12, wherein said fluid sensor is arranged so as to detect a variation in the pressure of said fluid.

14. A protective device for use on machining heads of a machine having a control device, said protective device enabling a shock or abnormal stress applied to the end of the machining head by an obstacle to be detected and the relative movement between the machining head and the obstacle to be interrupted, said protective device comprising a sensor mounted on a component located at the end of the machining head and arranged so as to detect the application to the end of the machining head of a pressure force exceeding a predetermined reference value, said detection being irrespective of the direction of the force and its point of application, said sensor also transmitting a signal to the control device of the machine in order to interrupt the relative movement between the machining head and the obstacle to reduce the pressure force to below said reference value, said sensor comprises a pressure-sensitive component and a fluid sensor, characterised in that said pressure-sensitive component is a hollow, deformable tube containing a fluid, and said fluid sensor detects a variation in the pressure of said fluid in response to a pressure being applied to said deformable tubes.

15. The device in accordance with claim 14 characterized in that said hollow tube containing a fluid is connected to a component arranged so as to indicate a change in the level of said fluid when there is a variation in the pressure of said fluid.

16. A protective device for use on machining heads enabling a shock or abnormal stress applied to the end of the machining head to be detected and the relative movement between the machining head and an obstacle to be interrupted, said protective device comprising a sensor mounted on a component located at the end of the machining head and arranged so as to detect the application to the machining head end of a pressure force exceeding a predetermined reference value, said detection being irrespective of the direction of application of the force and its point of application, said sensor also transmitting a signal to the controls of the machine in order to interrupt the relative movement between the machining head and the obstacle to reduce the pressure force to below said aforesaid reference value, said reduction of the pressure force including the elimination of the force altogether, said sensor including a pressure-sensitive component, characterised in that said device also includes a buffer component designed in such a manner so as to exert a pressure on said sensor when said buffer component is subjected to a horizontal, vertical or oblique stress from whatever direction.

* * * * *